(12) United States Patent
Le Maguet

(10) Patent No.: US 7,251,368 B2
(45) Date of Patent: *Jul. 31, 2007

(54) PIXEL-BASED DATA MODIFYING METHOD AND DEVICE

(75) Inventor: Yann Le Maguet, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 304 days.

This patent is subject to a terminal disclaimer.

(21) Appl. No.: 10/983,214

(22) Filed: Nov. 5, 2004

(65) Prior Publication Data

US 2005/0084167 A1 Apr. 21, 2005

Related U.S. Application Data

(63) Continuation of application No. 09/761,249, filed on Jan. 16, 2001, now Pat. No. 6,842,539.

(30) Foreign Application Priority Data

| Jan. 14, 2000 | (EP) | ................................. 00400101 |
| Apr. 18, 2000 | (EP) | ................................. 00401075 |

(51) Int. Cl.
*G06K 9/36* (2006.01)

(52) U.S. Cl. ...................... 382/236; 382/238; 382/239; 348/589; 348/598

(58) Field of Classification Search ............... 382/235, 382/236, 239; 375/240, 240.01, 240.12; 348/473

See application file for complete search history.

(56) References Cited

U.S. PATENT DOCUMENTS

| 6,181,743 | B1 * | 1/2001 | Bailleul | ...................... 375/240 |
| 6,226,041 | B1 * | 5/2001 | Florencio et al. | ............ 348/473 |
| 6,373,530 | B1 * | 4/2002 | Birks et al. | .................. 348/584 |
| 6,493,389 | B1 * | 12/2002 | Bailleul | .................. 375/240.12 |
| 6,594,311 | B1 * | 7/2003 | Pearlstein | ............... 375/240.01 |
| 6,621,933 | B2 * | 9/2003 | Chung et al. | ................ 382/233 |
| 6,639,996 | B2 * | 10/2003 | Suda | .......................... 382/100 |
| 6,725,372 | B1 * | 4/2004 | Lewis et al. | ................. 713/176 |
| 6,842,539 | B2 * | 1/2005 | Le Maguet | .................. 382/236 |

FOREIGN PATENT DOCUMENTS

WO 9951033 A2 10/1999

OTHER PUBLICATIONS

Kiya et al. "A Method of Inserting Binary Data into MPEG Bitstreams." Proc. Int. Symp. on Circuits and Systems, vol. 4, Jul. 1999, pp. 471-474.*

* cited by examiner

*Primary Examiner*—Vikkram Bali
(74) *Attorney, Agent, or Firm*—Larry Liberchuk

(57) ABSTRACT

The invention relates to a method of modifying data in an encoded data signal 125 corresponding to successive pictures divided into sub-pictures, for providing an output modified data signal 126. In particular, this invention can be used for the insertion of an additional data signal 127 into a compressed video signal 125. The proposed schemes according to the invention are based on a transcoder arrangement including at least partial decoding means and partial re-encoding means. This method leads to a cost-effective solution compared to the prior art comprising a minimum number of functional sub-steps, in particular including a unique motion compensation sub-step 205, taking advantage of simplifications and combinations between different sub-steps.

2 Claims, 3 Drawing Sheets

PIXEL-BASED DATA MODIFYING METHOD AND DEVICE

CROSS REFERENCE TO RELATED APPLICATION

This is a continuation of prior application Ser. No. 09/761,249 filed Jan. 16, 2001 now U.S. Pat. No. 6,842,539.

FIELD OF THE INVENTION

The present invention relates to a method of modifying data in an encoded data signal, comprising at least:
- a decoding step for decoding said encoded data signal and providing a decoded data signal,
- a re-encoding step performed on a modified data signal and generating a coding error,
- a prediction step for providing a motion-compensated signal from said coding error and comprising at least a subtracting sub-step between an input data signal obtained at least from said decoded data signal and said motion-compensated signal for obtaining said modified data signal.

The invention also relates to video processing devices for carrying out said method. This invention, may be used, for example, when a broadcaster wants to introduce additional data into a sequence of coded pictures. This invention finds applications not just in the field of MPEG-2 compression, but more generally in any digital video data compression system.

BACKGROUND OF THE INVENTION

Modifying data in an encoded data signal has become a vital function in studio editing environments. A possible solution has been proposed in the international patent application WO 99/51033 (PHF98546). This patent application describes a method and its corresponding device for modifying data in an encoded data signal. This method allows an additional data signal insertion, e.g. a logo inserting, into an MPEG-2 bitstream thanks to bit rate transcoding. Logo insertion comes as an extension of the bit rate transcoder. The corresponding diagram, depicted in FIG. 1, comprises a transcoding module 101 and a logo addition branch 102. The general outline of the transcoding module 101, well known to a person skilled in the art, comprises:
- a residue decoding branch 118 for receiving the input signal 125 and providing a decoded data signal Error_I(n). This branch comprises in series a variable length decoding 107, an inverse quantization 108 followed by an inverse discrete cosine transform 109.
- a re-encoding/decoding branch 120 for providing the output signal 126 and its decoded version respectively. The re-encoding part, for providing said output signal, comprises in series a discrete cosine transform 110, a quantization 111, a variable length coding 112 followed by a buffer 113, and regulation means 114 ensuring a constant picture quality of the output signal 126, and a first subtracter 122 generating a coding error. The decoding part comprises in series an inverse quantization 115 followed by an inverse discrete cosine transform 116.
- an intermediate branch 119 comprising a motion compensation 105 using motion vectors V(n) of the input signal, its associated memory 106 storing a previous signal, and a second subtracter 123. This branch, also called prediction loop, avoids the quality drift in the output signal by applying a motion compensation to said coding error generated during the re-encoding step.

The logo addition branch 102 is implemented thanks to a residue addition to the decoded signal Error_I(n), by means of the adding sub-step 121. This residue is formed by subtracting an additional data signal Logo(n) referenced 127 with a motion-compensated logo prediction referenced 129, obtained by means of the motion compensation sub-step 103, which is based on reference pictures containing logo previously stored in memory 104 and which uses the same vectors V(n) as the main input signal.

In the prior art diagram depicted in FIG. 1, two motion compensations are performed: a first one 105, well known and provided for correcting the quality drift on P and B pictures introduced by the quantization sub-step 111, and a second one 103 on an additional data signal 127. This motion compensation 103 generates said motion compensated signal PRED(Logo(n−1), V(n)) referenced 129 which is subtracted from said signal 127. Said motion-compensated signal is indeed essential since it cancels undesired parts of the signal relative to signal 127, previously motion-compensated by 105, in the input signal of the re-encoding step. Moreover, as a motion compensation always requires a storage of a previous signal, two memories 104 and 106 are also needed. Then, with these two motion compensation operations and two memory blocks, this solution remains not only complex as regards the CPU burden, but also expensive as regards storage memory.

SUMMARY OF THE INVENTION

It is an object of the invention to provide a method of modifying data in an encoded data signal which requires less memory capacity and puts a lesser burden on central processing units (CPU).

The method of modifying data according to the invention is characterized in that it comprises:
- a first sub-step for adding an additional data signal to said decoded data signal, for providing said input data signal,
- a second sub-step for adding said additional data signal to said coding error, said motion-compensated signal resulting from the motion compensation of the output signal of said second adding sub-step.

A variant of the previously characterized method is also proposed. It is characterized in that it comprises a sub-step for adding an additional data signal to said modified data signal, before said re-encoding step.

The corresponding diagrams, depicted in FIG. 2 and FIG. 3 respectively, are based on data addition in the pixel domain of the additional data signal 127 with the decoded data signal relative to the input data signal, or with signal situated in the transcoder drift correction loop, by means of said adding sub-steps.

According to the invention, in contrast to the prior art solution, no more separate motion compensation is applied to logo data since the motion compensation relative to logo data is merged with the motion compensation relative to the drift correction of the transcoder loop. The invention thus comprises a minimum number of functional sub-steps, leading to a cost-effective solution. Indeed, only one set of motion compensations and its associated memory storage is used, which simplification is possible in that advantage is taken of combinations between different sub-steps, and by using their own characteristics such as the linearity of the motion compensation.

Another object of the invention is to propose devices for carrying out the above-mentioned methods.

To this end, the invention relates in a first implementation, to a transcoding device for adding data to an encoded data signal, comprising:
- a first means for adding an additional data signal to said decoded data signal for providing said input data signal,
- a second means for adding said additional data signal to said coding error, said motion-compensated signal resulting from the motion compensation of the output signal of said second means.

In a second implementation, the invention also relates to a transcoding device for adding data to an encoded data signal, characterized in that it comprises means for adding an additional data signal to said modified data signal, before re-encoding means.

Detailed explanations and other aspects of the invention are given below.

BRIEF DESCRIPTION OF THE DRAWINGS

The particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

As was stated above, the present invention aims at reducing the cost of the prior art method for modifying data in an encoded data signal. Such an invention is well adapted to the case of MPEG-2 coded video signals as the input signal, but it will be apparent to a person skilled in the art that such a method is applicable to any coded signal that has been encoded with a block-based compression method such as, for example, the one described in MPEG-4, H.261 or H.263 standards. In the following, the invention will be detailed assuming that encoded video signals comply with the MPEG-2 international video standard (Moving Pictures Experts Group, ISO/IEC 13818-2).

Figure 2:
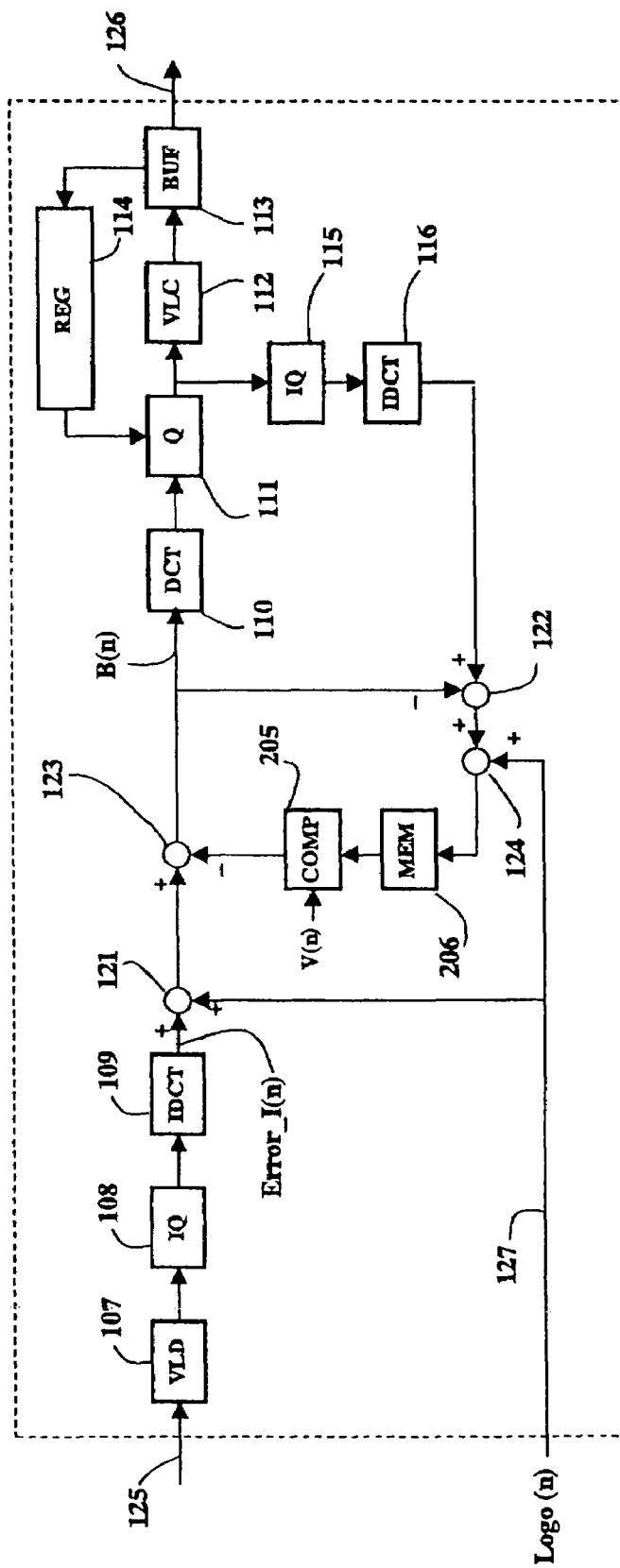
FIG. 2 illustrates a first embodiment of the technical solution according to the present invention.

FIG. 2 depicts the first cost-effective arrangement for data insertion into an encoded data signal, according to the present invention. This arrangement re-uses the aim of the transcoder described above, into which are inserted sub-steps aiming at modifying the input signal. Indeed, the input signal is modified by a pixel-based data signal 127 simultaneously introduced owing to two adding sub-steps:
- the sub-step 121 placed at the output of the error residue decoding, more precisely on the output signal of the inverse discrete cosine transform 109. The modification of the input signal, e.g. in the case of a logo insertion, is therefore first implemented by means of an addition between the inserted data signal 127 and the incoming data signal Error_I(n). This addition results in a signal corresponding to the positive input of the subtracting sub-step 123.
- the sub-step 124 at the input of the memory 206 relative to the motion compensation 205.

The modification of the input signal, e.g. in case of a logo addition, is therefore secondly implemented by means of an addition between the inserted data signal 127 and the output signal of the subtracting sub-step 122. This addition results in a signal corresponding to the input signal of the memory 206.

From an algorithmic point of view, this first arrangement proposed according to the invention is equivalent to the one described in the prior art of FIG. 1, as it can be recursively demonstrated hereinafter.

Figure 1:
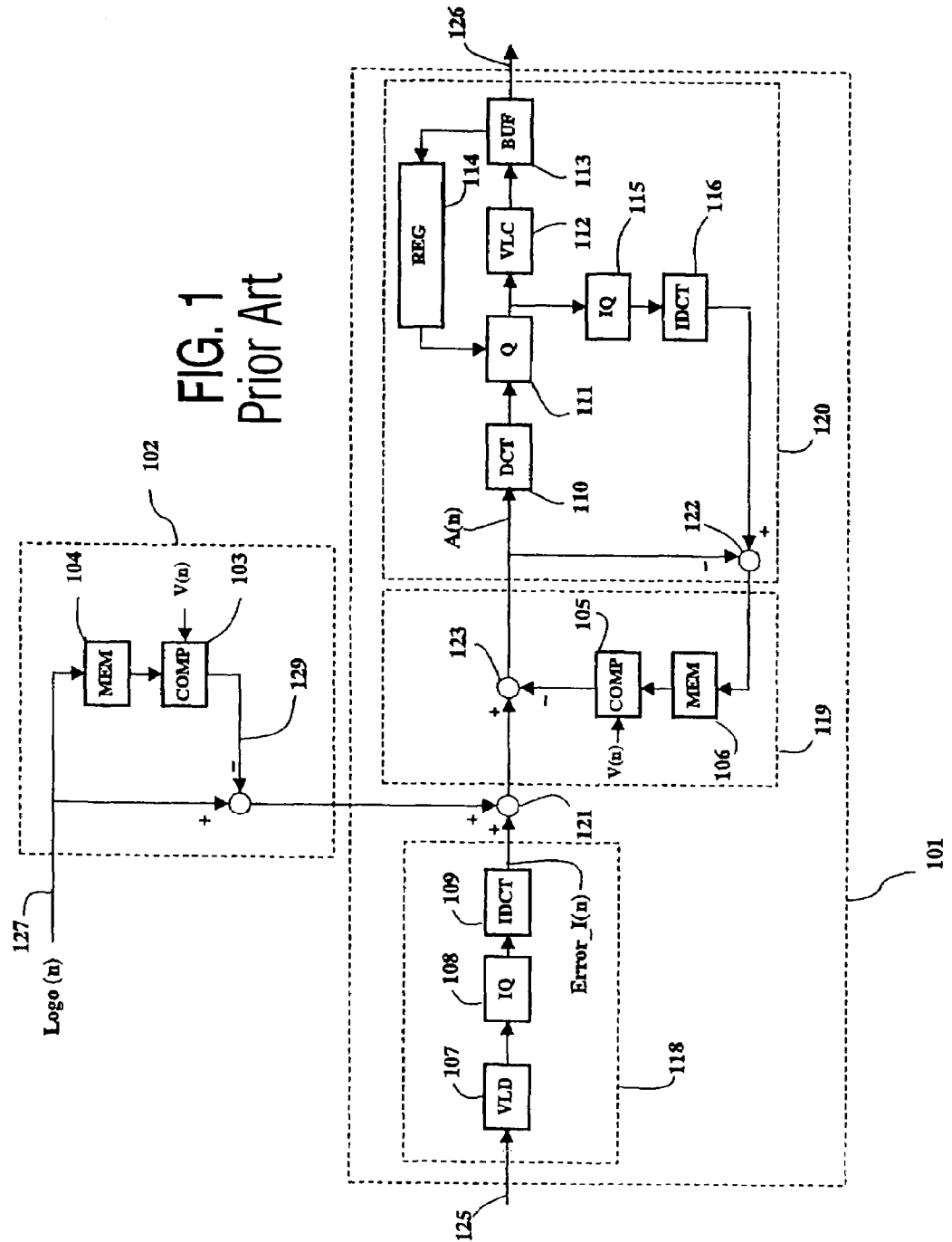
FIG. 1 illustrates the outline, as known in the prior art, of a transcoder with its logo insertion branch.

The following notations will be adopted for the demonstration:

V(n): vectors of picture number n,

I(n): decoded input picture number n,

Error_I(n): error residue of input picture number n,

O1 (n): decoded picture number n corresponding to the output signal of FIG. 1,

MEM1 (n): picture number n stored in the frame memory 106,

O2 (n): decoded picture number n corresponding to the output signal of FIG. 2,

MEM2 (n): picture number n stored in the frame memory 206,

PRED(X(n), V(n+1)): motion compensation of picture X(n) using vectors V(n+1). It corresponds to a predicted version of picture X(n+1), T: transform defined by T(x)=IDCT(IQ(Q(DCT(x)))).

Note that the decoded pictures I(n), O1 (n) and O2 (n) are not represented by any figures since only compressed signals are accessible.

The equivalence between the prior art and the diagram of FIG. 2 will be demonstrated if for each n, the three following relations are valid:

$$O1(n)=O2(n) \qquad 1)$$

$$MEM1(n)=O1(n)-I(n)-Logo(n) \qquad 2)$$

$$MEM2(n)=O2(n)-I(n) \qquad 3)$$

Obviously, the input signal and the inserted data signal 127 of FIG. 1 and FIG. 2 are supposed to be identical in this demonstration.

For the case where n=0, corresponding to an Intra-coded picture, it can be written:

$$Error\_I(0)=I(0) \qquad 4)$$

It can be deduced from FIG. 1:

$$O1(0)=T(I(0)+Logo(0)) \qquad 5)$$

$$MEM1(0)=O1(0)-I(0)-Logo(0) \qquad 6)$$

It can be deduced from FIG. 2:

$$O2(0)=T(I(0)+Logo(0)) \qquad 7)$$

$$MEM2(0)=O2(0)-I(0) \qquad 8)$$

It is possible to conclude from relations (5), (6), (7) and (8) that relations (1), (2) and (3) are valid for n=0. Let us suppose they are still valid at the rank n, and let us demonstrate that (1), (2) and (3) are also valid at the rank (n+1).

Let us now introduce the terms A(n+1) and B(n+1) as:

$$A(n+1) = \text{Error\_}I(n+1) + \text{Logo}(n+1) - \text{PRED}(\text{Logo}(n), V(n+1)) - \text{PRED}(\text{MEM1}(n), V(n+1))$$

$$B(n+1) = \text{Error\_}I(n+1) + \text{Logo}(n+1) - \text{PRED}(\text{MEM2}(n), V(n+1))$$  (5)

Since (2) and (3) are valid at the rank n, and since the motion compensation is linear, A(n+1) and B(n+1) become:

$$A(n+1) = \text{Error\_}I(n+1) + \text{PRED}(I(n), V(n+1)) + \text{Logo}(n+1) - \text{PRED}(O1(n), V(n+1))$$  (9)

$$A(n+1) = I(n+1) + \text{Logo}(n+1) - \text{PRED}(O1(n), V(n+1))$$  (10)

$$B(n+1) = \text{Error\_}I(n+1) + \text{PRED}(I(n), V(n+1)) + \text{Logo}(n+1) - \text{PRED}(O2(n), V(n+1))$$  (11)

$$B(n+1) = I(n+1) + \text{Logo}(n+1) - \text{PRED}(O2(n), V(n+1))$$  (12)

Since (1) is valid for at the rank n, relations (10) and (12) become:

$$A(n+1) = B(n+1) = I(n+1) + \text{Logo}(n+1) - \text{PRED}(O1(n), V(n+1))$$  (13)

It can be deduced from FIG. 1 and FIG. 2:

$$O1(n+1) = T(A(n+1)) + \text{PRED}(O1(n), V(n+1))$$  (14)

$$\text{MEM1}(n+1) = T(A(n+1)) - A(n+1)$$  (15)

$$O2(n+1) = T(B(n+1)) + \text{PRED}(O2(n), V(n+1))$$  (16)

$$\text{MEM2}(n+1) = T(B(n+1)) - B(n+1) + \text{Logo}(n+1)$$  (17)

One can conclude from relations (13), (15) and (17) that:

$$\text{MEM1}(n+1) = O1(n+1) - I(n+1) - \text{Logo}(n+1)$$  (18)

$$\text{MEM2}(n+1) = O2(n+1) - I(n+1)$$  (19)

This means that relations (1), (2) and (3) are valid for the rank n+1, which proves the algorithmic equivalence between the arrangement of FIG. 1 of the prior art, and the first proposed arrangement depicted in FIG. 2 according to the invention. This proposed arrangement thus ensures that the modified output signal has the same quality as the one of the prior art but is obtained in a more cost-effective manner. Indeed, no more separate motion compensation and its associated memory is needed for the inserted data signal 127, since said data can be directly inserted into the transcoding pseudo-prediction loop, this simplification being justified by the linearity of the motion compensation. This merging of the two motion compensations—if the insertion of the two adding sub-steps 121 and 124, at no cost for most digital signal processors, is disregarded—represents a substantial gain in terms of CPU occupation as well as memory storage.

Figure 3:
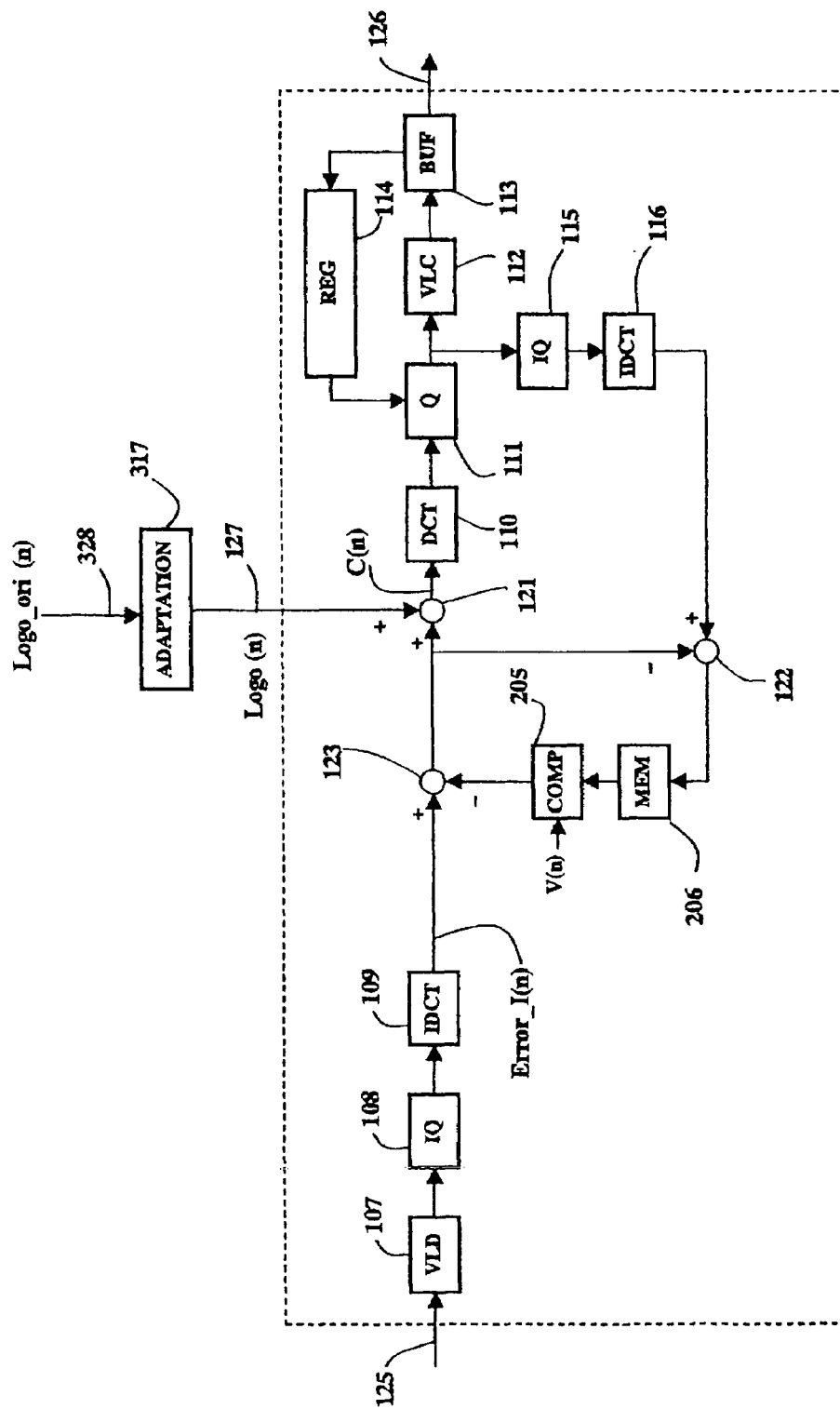
FIG. 3 illustrates a second embodiment of the technical solution according to the present invention.

FIG. 3 depicts an alternative embodiment of the present invention. It is also based on a transcoder arrangement identical to the one previously described and depicted in FIG. 1. Compared with a transcoder architecture such as the one depicted in FIG. 1, only a few modifications are made to obtain a change in the input signal. Indeed, the input signal is modified by signal 127 introduced by means of only one adding sub-step 121 placed at the input of the re-encoding step, more precisely on the input signal of the discrete cosine transform 110. The modification of the input signal, e.g. in the case of a logo addition, is therefore implemented by means of an addition between the inserted data signal 127 and the output signal of the subtracting sub-step 123. This addition results in a signal corresponding to the input of the discrete cosine transform 110. From an algorithmic point of view, this second arrangement is also equivalent to the prior art arrangement of FIG. 1.

The following notations will be used for the demonstration:
O3 (n): decoded picture number n corresponding to the output signal of FIG. 3,
MEM3 (n): picture number n stored in the frame memory 206.

Note that the decoded pictures O3 (n) is not represented by any figures since only compressed signals are accessible.

The same recursive demonstration can be made in proving for each n, the three following equations:

$$O1(n) = O3(n)$$  (20)

$$\text{MEM1}(n) = O1(n) - I(n) - \text{Logo}(n) \text{ (as demonstrated above)}$$  (2)

$$\text{MEM3}(n) = O3(n) - I(n)$$  (21)

Obviously, the input signal and the inserted data signal 127 of FIG. 1 and FIG. 3 are supposed to be identical in this demonstration.

For the case where n=0, corresponding to an Intra-coded picture, it can be written:

$$\text{Error\_}I(0) = I(0)$$  (22)

It can be deduced from FIG. 3:

$$O3(0) = T(I(0) + \text{Logo}(0))$$  (23)

$$\text{MEM3}(0) = O3(0) - I(0)$$  (24)

From relations (5), (6), (23) and (24), it is possible to conclude that relations (20) and (21) are valid for n=0. Let us suppose they are still valid at the rank n, and let us demonstrate that (20) and (21) are also valid at the rank (n+1).

Let us now introduce the terms C(n+1) as:

$$C(n+1) = \text{Error\_}I(n+1) + \text{Logo}(n+1) - \text{PRED}(\text{MEM3}(n), V(n+1))$$

Since (21) are valid at the rank n, and since the motion compensation is linear, C(n+1) becomes:

$$C(n+1) = \text{Error\_}I(n+1) + \text{PRED}(I(n), V(n+1)) + \text{Logo}(n+1) - \text{PRED}(O3(n), V(n+1))$$  (25)

$$C(n+1) = I(n+1) + \text{Logo}(n+1) - \text{PRED}(O3(n), V(n+1))$$  (26)

Since (20) is valid for the rank n, relation (26) becomes:

$$A(n+1) = C(n+1) = I(n+1) + \text{Logo}(n+1) - \text{PRED}(O1(n), V(n+1))$$  (27)

It can be deduced from FIG. 3:

$$O3(n+1) = T(C(n+1)) + \text{PRED}(O3(n), V(n+1))$$  (28)

$$\text{MEM3}(n+1) = T(C(n+1)) - C(n+1) + \text{Logo}(n+1)$$  (29)

It can be concluded from relations (15), (27) and (29), that:

$$\text{MEM3}(n+1) = O3(n+1) - I(n+1)$$  (30)

So relations (20) and (21) are valid for the rank n+1. This proposed scheme thus ensures that identical results will be obtained in the output signals of FIG. 1 and FIG. 3. No more separate motion compensation and its associated memory on signal 127 are needed, and said pixel-based data signal 127 is introduced thanks to the only no-cost adding sub-step ADD. In terms of CPU occupation and memory storage, this solution in almost the same as the one of an isolated transcoder without data insertion, which is remarkable.

In FIG. 2 and FIG. 3 described above according to the invention, the input signal data is modified thanks to the insertion of the pixel-based data signal 127 by means of adding sub-steps. These inserted data may correspond to a logo, i.e. a single small picture, or a ticker, i.e. successive small different pictures. In both cases, each picture must be pixel-based, e.g. by being encoded according to the so-called bitmap format which corresponds to a rough digital image coding. Of course, before insertion by means of the adding sub-steps, said signal 127 may derive from an adapted pixel-based signal Logo_ori(n) referenced 328 in order to optimize the quality of the output signal, as it is only represented in FIG. 3 with step 317, for example by changing the luminance or the chrominance levels, as far as their format is still compatible. It is obvious that such an adaptation does not restrict the scope and the degree of protection of the present invention.

This method of modifying data in an encoded data signal can be implemented in several manners, such as by means of wired electronic circuits or, alternatively, by means of a set of instructions stored in a computer-readable medium, said instructions replacing at least a portion of said circuits and being executable under the control of a computer or a digital processor in order to carry out the same functions as fulfilled in said replaced portions. The invention then also relates to a computer-readable medium comprising a software module that includes computer executable instructions for performing the steps, or some steps, of the method described above.

The invention claimed is:

1. A method of modifying data in an encoded data signal comprising:
   a) a decoding step for decoding said encoded data signal and providing a decoded data signal,
   b) a re-encoding step performed on a modified data signal and generating a coding error,
   c) a prediction step for providing a motion-compensated signal from said coding error and comprising at least a subtracting sub-step between an input data signal obtained at least from said decoded data signal and said motion-compensated signal for obtaining said modified data signal,
   characterized in that it comprises a sub-step for adding an additional data signal to said modified data signal, before said re-encoding step.

2. A computer program, embodied in a computer readable medium, for a transcoding device for adding data to an encoded data signal, comprising a set of instructions which, when loaded into said device, causes said device to carry out the steps, comprising:
   a decoding step for decoding said encoded data signal and providing a decoded data signal;
   a re-encoding step performed on a modified data signal and generating a coding error;
   a prediction step for providing a motion-compensated signal from said coding error and comprising at least a subtracting sub-step between an input data signal obtained at least from said decoded data signal and said motion-compensated signal for obtaining said modified data signal, characterized in that it comprises a sub-step for adding an additional data signal to said modified data signal before said re-encoding step.

* * * * *